(12) United States Patent
Yoshimatsu

(10) Patent No.: US 8,820,296 B2
(45) Date of Patent: Sep. 2, 2014

(54) CONTROL DEVICE FOR ENGINE

(75) Inventor: Akio Yoshimatsu, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/879,276

(22) PCT Filed: Nov. 4, 2010

(86) PCT No.: PCT/JP2010/069590
§ 371 (c)(1),
(2), (4) Date: Apr. 12, 2013

(87) PCT Pub. No.: WO2012/060000
PCT Pub. Date: May 10, 2012

(65) Prior Publication Data
US 2013/0220273 A1    Aug. 29, 2013

(51) Int. Cl.
*F02D 13/02* (2006.01)
*F02D 29/00* (2006.01)
*F02D 41/10* (2006.01)
*F01L 1/34* (2006.01)
*F02D 45/00* (2006.01)
*F02D 41/00* (2006.01)

(52) U.S. Cl.
CPC ...... *F02D 13/0242* (2013.01); *F02D 2041/001* (2013.01); *F02D 41/10* (2013.01); *F02D 2200/602* (2013.01); *Y02T 10/18* (2013.01); *F02D 13/0215* (2013.01)
USPC ...................................... 123/347; 123/90.15

(58) Field of Classification Search
USPC .............. 123/347, 90.15, 90.11, 90.17, 90.18
See application file for complete search history.

(56) References Cited

U.S. PATENT DOCUMENTS 6,405,693 B2 * 6/2002 Yoeda et al. ................ 123/90.15
2001/0017115 A1   8/2001 Yoeda et al.

FOREIGN PATENT DOCUMENTS

| JP | 02-115512 A | 4/1990 | |
|----|----|----|----|
| JP | 2001-241337 A | 9/2001 | |
| JP | 2009-144521 A | 7/2009 | |
| JP | 2010285951 A * | 12/2010 | ............. F02D 13/02 |

* cited by examiner

*Primary Examiner* — Hieu T Vo
(74) *Attorney, Agent, or Firm* — Sughrue Mion, PLLC

(57) ABSTRACT

An ECU 1 is provided for an engine 50 provided with an exhaust VVT 57 which is capable of varying opening and closing timings of an exhaust valve 55A of plural exhaust valves 55 provided for a combustion chamber 58 with respect to opening and closing timings of an exhaust valve 55B of plural exhaust valves 55. The ECU 1 is provided with a control unit performing the phase control for making the opening timing of the exhaust valve 55A identical to the opening timing of the exhaust valve 55B when the engine 50 accelerates. Specifically, the control unit performs the advance control for making the phase of the exhaust valve 55A identical to the phase of the exhaust valve 55B.

3 Claims, 4 Drawing Sheets

CONTROL DEVICE FOR ENGINE

CROSS REFERENCE TO RELATED APPLICATIONS

This application is a National Stage of International Application No. PCT/JP2010/069590 filed Nov. 4, 2010, the contents of all of which are incorporated herein by reference in their entirety.

TECHNICAL FIELD

The present invention relates to a control device for an engine, in particularly, to a control device for an engine controlling exhaust sound of the engine provided with a valve device which is capable of varying opening and closing timings of one exhaust valve of a plurality of exhaust valves provided for a combustion chamber with respect to opening and closing timings of another exhaust valve of the plurality of exhaust valves.

BACKGROUND ART

There is known an engine provided with a valve device which is capable of varying opening and closing timings of one exhaust valve of a plurality of exhaust valves provided for a combustion chamber with respect to opening and closing timings of another exhaust valve of the plurality of exhaust valves. Patent Document 1 discloses an internal combustion engine provided with plural electromagnetic valves as exhaust valves in the same cylinder. In this internal combustion engine, the difference between the earliest opening timing of an exhaust valve and the latest opening timing of another exhaust valve is larger as the engine rotational speed is lower, thereby suppressing the exhaust sound. Patent Document 2 discloses a valve device varying valve timings of first and second engine valves which are the same type of engine valves provided for a combustion chamber.

PRIOR ART DOCUMENT

Patent Document

[Patent Document 1] Japanese Patent Application Publication No. 2001-241337
[Patent Document 2] Japanese Patent Application Publication No. 2009-144521

DISCLOSURE OF THE INVENTION

Problems to be Solved by the Invention

FIG. 8 is a view of an example of a change in the exhaust pressure pulsation depending on a crank angle. The vertical axis indicates the exhaust pressure, and the horizontal axis indicates the crank angle. The solid line indicates a case of opening the plural exhaust valves provided for the combustion chamber simultaneously. The broken line indicates a case of opening the plural exhaust valves with different phases thereof. As illustrated in FIG. 8, the exhaust pressure is reduced during the exhaust valve opening period R in the case of opening the plural exhaust valves with different phases thereof, as compared with the case of opening the plural exhaust valves simultaneously. As a result, the exhaust sound can be suppressed.

This is because the exhaust sound of the first explosion increases in proportion to the blow down pressure when the exhaust valves open, and this is because the blow down pressure increases in proportion to an opening area opened by the exhaust valves. However, the exhaust sound is suppressed when the acceleration is required to a large degree such as when the acceleration is required at full throttle, so that the feeling of acceleration is lost. Thus, it is desirable to suitably control the exhaust sound in consideration of the acceleration of the engine.

The present invention has been made in view of the above circumstances and has an object to provide a control device for an engine suitably controlling exhaust sound of the engine in consideration of the acceleration of the engine provided with a valve device which is capable of varying opening and closing timings of one exhaust valve of a plurality of exhaust valves provided for a combustion chamber with respect to opening and closing timings of another exhaust valve of the plurality of exhaust valves.

Means for Solving the Problems

An aspect of the present invention is a control device for an engine provided with a valve device which is capable of varying opening and closing timings of at least one exhaust valve of a plurality of exhaust valves provided for a combustion chamber with respect to opening and closing timings of another exhaust valve of the plurality of exhaust valves, the control device for the engine including a control unit configured to perform phase control for making a phase of the one exhaust valve identical to a phase of the another exhaust valve depending on an amount of change in pressing level of an accelerator pedal, when performing the phase control at the time when the engine accelerates.

In the present invention, it is preferable that the control unit is configured to perform advance control for making the phase of the one exhaust valve identical to the phase of the another exhaust valve.

In the present invention, it is preferable that the control unit is configured to adjust an advance amount of the one exhaust valve depending on a degree of an acceleration requirement of the engine when performing the advance control.

In the present invention, it is preferable that the control unit is configured to perform retardation control for retarding the phase of the one exhaust valve to increase a phase difference between the one exhaust valve and the another exhaust valve when the engine does not accelerate.

Effects of the Invention

According to the present invention, it is possible to suitably control exhaust sound of an engine in consideration of the acceleration of the engine provided with a valve device which is capable of varying opening and closing timings of one exhaust valve of a plurality of exhaust valves provided for a combustion chamber with respect to opening and closing timings of another exhaust valve of the plurality of exhaust valves.

MODES FOR CARRYING OUT THE INVENTION

Embodiments will be described with reference to drawings.

Figure 1:
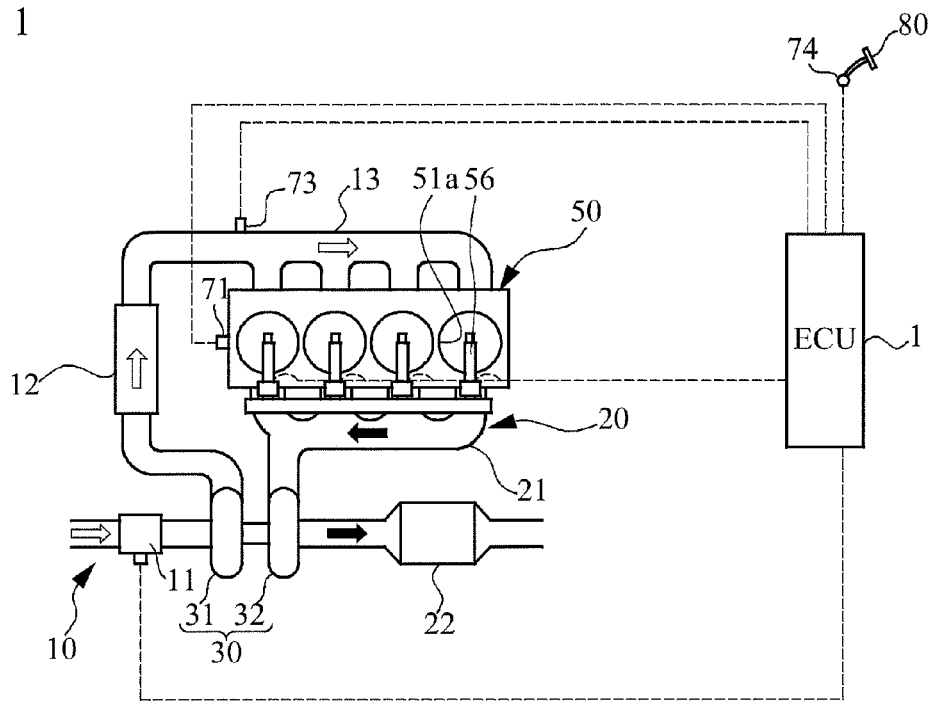
FIG. 1 is a general configuration view of an engine and the vicinity thereof.
Figure 2:
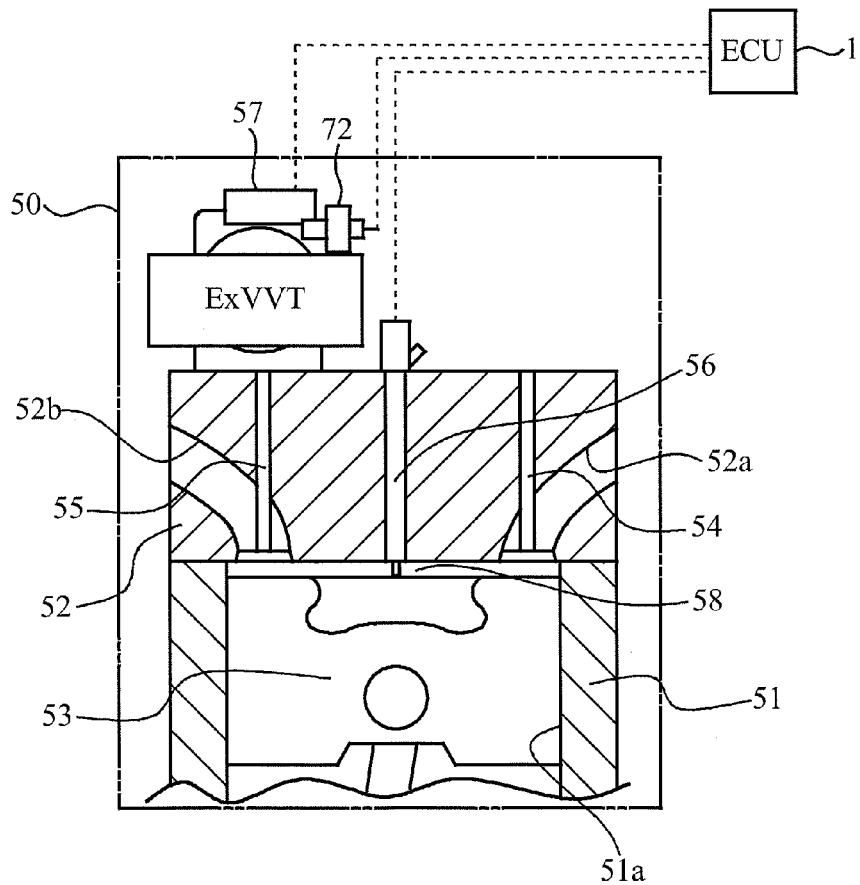
FIG. 2 is a schematic view of the engine.
Figure 3:
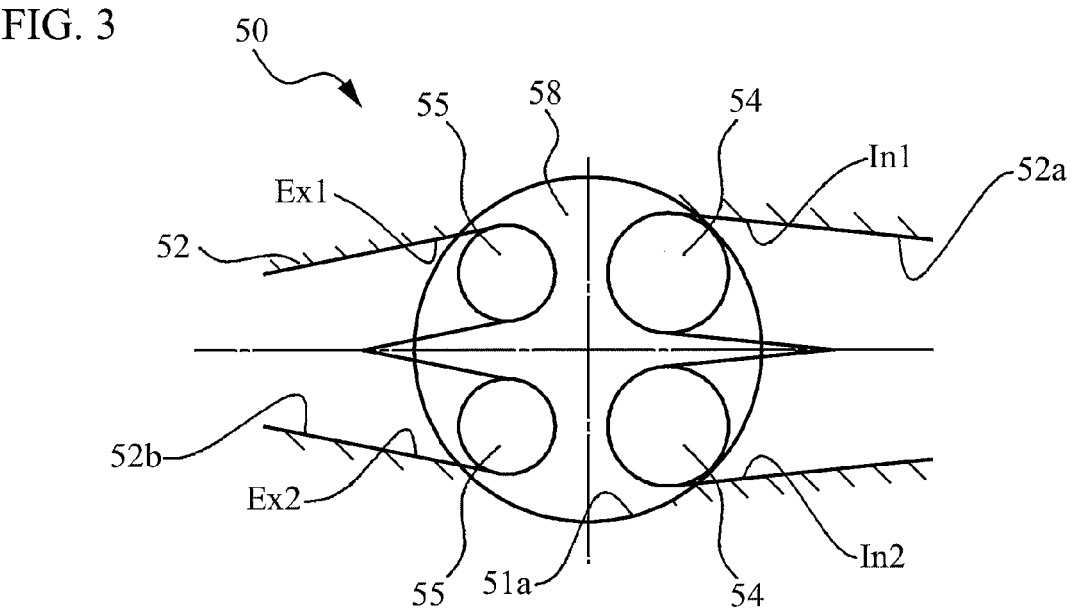
FIG. 3 is an arrangement view of valves of the engine.

FIG. 1 is a general configuration view of an engine 50 and the vicinity thereof. FIG. 2 is a schematic view of the engine 50. FIG. 3 is an arrangement view of valves of the engine 50. Each configuration illustrated in FIG. 1 is mounted on a vehicle. As illustrated in FIG. 1, an intake system 10 includes an airflow meter 11, an inter cooler 12, and an intake manifold 13. The airflow meter 11 measures an intake air amount GA of the engine 50. The inter cooler 12 cools the intake air. The intake manifold 13 distributes the intake air to each cylinder 51a of the engine 50.

An exhaust system 20 includes an exhaust manifold 21 and a catalyst 22. The exhaust manifold 21 causes the exhaust gas from each cylinder 51a to join in an exhaust path at the downstream side. The catalyst 22 purifies the exhaust gas. A supercharger 30 is an exhaust drive-type supercharger, and supercharges the intake air of the engine 50. The supercharger 30 includes a compressor portion 31 and a turbine portion 32. The compressor portion 31 is provided in the intake system 10, and the turbine portion 32 is provided in the exhaust system 20.

The engine 50 is a compression ignition type internal combustion engine (diesel engine). As illustrated in FIG. 2, the engine 50 includes a cylinder block 51, a cylinder head 52, a piston 53, intake valves 54, exhaust valves 55, a fuel injection valve 56, and an exhaust Variable Valve Timing (VVT) 57.

A cylinder 51a is provided in the cylinder block 51. The piston 53 is accommodated in the cylinder 51a. The cylinder head 52 is fixed on the top surface of the cylinder block 51. A combustion chamber 58 is formed as the space surrounded by the cylinder block 51, the cylinder head 52, and the piston 53.

An intake port 52a and an exhaust port 52b are formed in the cylinder head 52. Also, the intake valves 54 and the exhaust valves 55 are provided. The intake port 52a introduces the intake air to the combustion chamber 58, and the exhaust port 52b discharges the exhaust gas from the combustion chamber 58. The intake valves 54 open and close the intake port 52a, and the exhaust valves 55 open and close the exhaust port 52b.

As illustrated in FIG. 3, specifically, the engine 50 is provided with plural (here, two) intake valves 54 at the combustion chamber 58. Also, plural (here, two) exhaust valves 55 are provided. In this regard, specifically, the intake port 52a includes partial intake ports In1 and In2 which are divergent and opened from the upstream side to the combustion chamber 58. Further, the exhaust port 52b includes partial exhaust ports Ex1 and Ex2 which are divergent and opened from the downstream side to the combustion chamber 58. Also, the two intake valves 54 respectively open and close the partial intake ports In1 and In2, and the two exhaust valves 55 respectively open and close the partial exhaust ports Ex1 and Ex2.

As illustrated in FIG. 2, the fuel injection valve 56 is provided in the cylinder head 52. The fuel injection valve 56 injects the fuel directly into the cylinder. Also, the exhaust VVT 57 is provided in the cylinder head 52. The exhaust VVT 57 is a valve device which is capable of varying the opening timing of at least one exhaust valve 55 (hereinafter referred to as exhaust valve 55A) of the two exhaust valves 55 provided for the combustion chamber 58 with respect to the opening timing of another exhaust valve 55 (hereinafter referred to as exhaust valve 55B) of the two exhaust valves 55. In this regard, the opening timing may be opening and closing timings. The exhaust valve 55A corresponds to one exhaust valve, and the exhaust valve 55B corresponds to another exhaust valve.

In a case of varying the opening timing of the exhaust valve 55A with respect to the opening timing of the exhaust valve 55B, a valve device, which is capable of varying at least the opening timing of the exhaust valve 55A of the exhaust valves 55A and 55B, is applied to the exhaust VVT 57. For example, a valve device, which is capable of setting the opening timings of the exhaust valves 55A and 55B independently, may be applied to the exhaust VVT 57. Specifically, for example, a valve device, which includes the electromagnetic valves disclosed in Patent Document 1 mentioned above as the exhaust valves 55A and 55B, is applicable to such the above valve device. Also, for example, the valve device disclosed in Patent Document 2 can be applied.

Various sensors are provided in the engine 50. Specifically, for example, a crank corner sensor 71 for detecting the crank angle and the engine rotational speed NE is provided. Also, a valve timing sensor 72 for detecting the valve timings of the exhaust valves 55A and 55B is provided in the exhaust VVT 57. A supercharging pressure sensor 73 for detecting the supercharging pressure is provided in the intake system 10.

An ECU 1 is an electronic control unit according to a control device for an engine. The ECU 1 includes a microcomputer equipped with a CPU, a ROM, a RAM, and the like, and input-output circuits 75 and 76. The ECU 1 is electrically connected with the airflow meter 11 and the above mentioned sensors 71 to 73. The engine load factor KL can be detected by the ECU 1 based on, for example, the output signals from the airflow meter 11.

Further, the ECU 1 is electrically connected with various sensors and switches such as an accelerator opening sensor 74 for detecting the pressing amount α of an accelerator pedal 80. The accelerator pedal 80 is an acceleration requirement portion to accelerate the engine 50, and the pressing amount α is a degree of the acceleration requirement. The ECU 1 is electrically connected with various controlled objects such as the fuel injection valve 56 and the exhaust VVT 57.

The ROM stores map data or programs about various kinds of processing performed by the CPU. The CPU processes based on a program stored in the ROM and uses a temporary memory area of the RAM if necessary, whereby the ECU 1 functions as various portions such as a control portion, a determination portion, and a detecting portion. For example, in the ECU 1, the function of a control unit as will be described below is achieved.

The control unit performs the phase control which makes the opening timing of the exhaust valve 55A identical to the opening timing of the exhaust valve 55B, when the engine 50 accelerates. In this regard, the control unit starts performing the phase control, specifically, when the acceleration of the engine 50 is required. For example, the acceleration of the engine 50 is required, when the accelerator pedal 80 is pressed. The control unit starts performing the phase control, when the acceleration of the engine 50 is required, specifically, when the amount of change Δα in pressing level is larger than a predetermined value β. The amount of change Δα in pressing level when the acceleration of the engine 50 is required is a degree of the acceleration requirement when the acceleration is required.

Also, the control unit performs the phase control such that the intake air amount GA becomes a predetermined amount (for example, the maximum amount) when a predetermined time T elapses from the time when the acceleration of the engine 50 is required. The predetermined time T can be set shorter than an elapsed time t' which elapses from the time when the acceleration of the engine 50 is required to the time when the intake air amount GA becomes a predetermined amount, in a case of not performing the phase control making the opening timing of the exhaust valve 55A identical to the opening timing of the exhaust valve 55B when the engine 50 accelerates.

The control unit stops the phase control making the opening timing of the exhaust valve 55A identical to the opening timing of the exhaust valve 55B, when the engine 50 does not accelerate (when the vehicle is in the steady driving state). In contrast, the control unit performs the phase control varying the opening timing of the exhaust valve 55A so as to generate the phase difference $\gamma$ between the opening timings of the exhaust valves 55A and 55B, when the engine 50 does not accelerate. The time when the engine 50 does not accelerate includes the time when the accelerator pedal 80 is not pressed, and further, for example, the time when the engine 50 is brought into the steady driving state in pressing the accelerator pedal 80 (the time when the intake air amount GA is the maximum).

Figure 4:
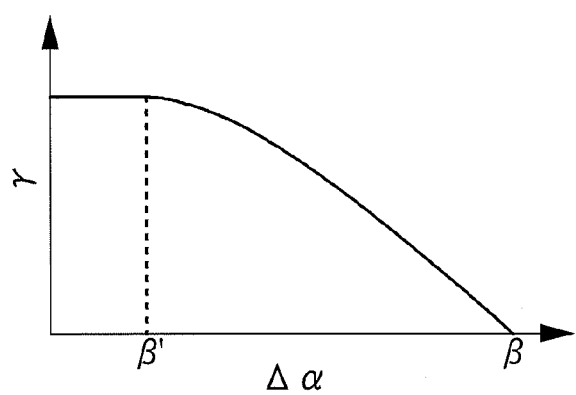
FIG. 4 is a view of a relationship between an amount of change in pressing level and a phase difference between opening timings of exhaust valves.

When performing the phase control at the time when the engine 50 accelerates, the control unit adjusts the amount of change in the phase of the exhaust valve 55A depending on the amount of change $\Delta\alpha$ in pressing level. FIG. 4 is a view of a relationship between the amount of change $\Delta\alpha$ in pressing level and the phase difference $\gamma$. The vertical axis indicates the phase difference $\gamma$, and the horizontal axis indicates the amount of change $\Delta\alpha$ in pressing level.

As illustrated in FIG. 4, the control unit adjusts the amount of change in the phase of the exhaust valve 55A such that the phase difference $\gamma$ is made larger as the amount of change $\Delta\alpha$ in pressing level is smaller than a predetermined value $\beta$. When the amount of change $\Delta\alpha$ in pressing level is smaller than a predetermined value $\beta'$ smaller than the predetermined value $\beta$, the control unit may adjust the amount of change in the phase of the exhaust valve 55A such that the phase difference $\gamma$ becomes constant.

Specifically, the control unit performs the advance control making the phase of the exhaust valve 55A identical to the phase of the exhaust valve 55B, when the engine 50 accelerates. Also, the retardation control retarding the phase of the exhaust valve 55A is performed so as to increase the phase difference $\gamma$ between the exhaust valves 55A and 55B, when the engine 50 does not accelerate.

Figure 5:
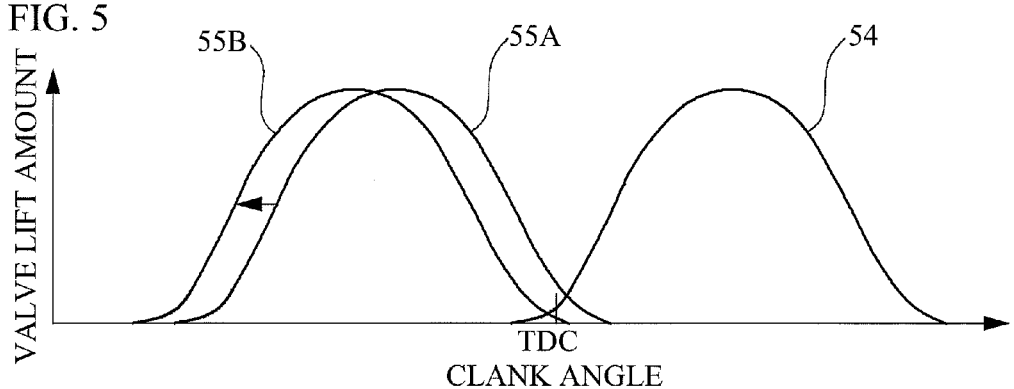
FIG. 5 is a view of a change in the valve timing in an acceleration state.

FIG. 5 is a view of a change in the valve timing in the acceleration state of the engine 50. The vertical axis indicates the valve lift amount, and the horizontal axis indicates the crank angle. Specifically, the control unit performs the advance control making the whole phase of the exhaust valve 55A identical to the whole phase of the exhaust valve 55B without varying the phase of the exhaust valve 55B. However, the control is not limited to this. For example, the control unit may perform the phase control varying the phase of the exhaust valve 55B.

Figure 6:
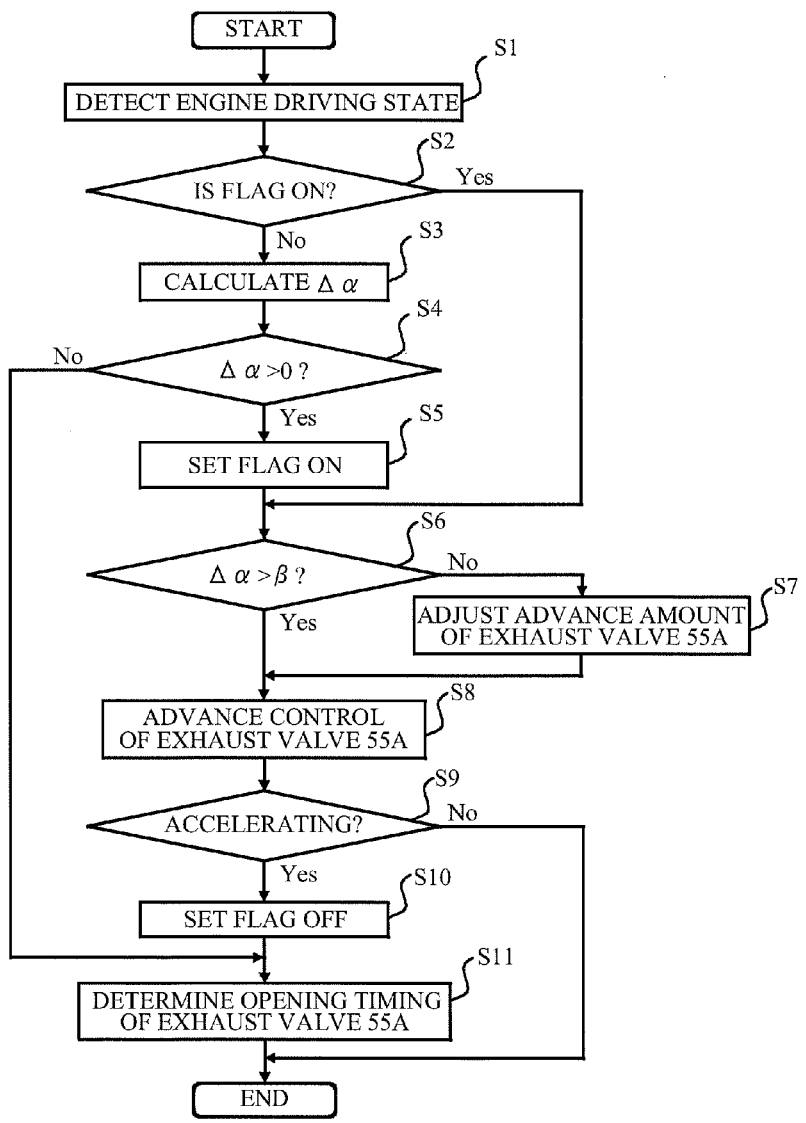
FIG. 6 is a view of a flow chart of the operation of an ECU.

Next, a description will be given of the operation of the ECU 1 with reference to a flowchart illustrated in FIG. 6. The ECU 1 detects the engine driving state (step S1). In step S1, for example, the ECU 1 detects, specifically, the engine rotational speed NE, the intake air amount GA, and the pressing amount $\alpha$. Subsequently, the ECU 1 determines whether or not the flag is ON (step S2). The flag is provided for determining whether or not the advance control of the exhaust valve 55A is being performed, and the flag is set to OFF in the initial state. If a negative determination is made in step S2, the ECU 1 calculates the amount of change $\Delta\alpha$ in pressing level (step S3).

Subsequently, the ECU 1 determines whether or not the amount of change $\Delta\alpha$ in pressing level is more than zero (step S4). If a negative determination is made, it is determined that the engine 50 does not accelerate. In this case, the ECU 1 determines the opening timing of the exhaust valve 55A depending on the detected engine driving state (step S11). The opening timing can be set beforehand by the map data based on the engine driving state (for example, the engine rotational speed NE and the engine load factor KL). This flowchart temporarily finishes after step S11.

On the other hand, if a positive determination is made in step S4, the ECU 1 sets the flag ON (step S5). After step S5 or after a positive determination is made in step S2, the ECU 1 determines whether or not the amount of change $\Delta\alpha$ in pressing level is larger than the predetermined value $\beta$ (step S6). If a negative determination is made, the ECU 1 adjusts the advance amount of the exhaust valve 55A depending on the amount of change $\Delta\alpha$ in pressing level (step S7).

After a positive determination is made in step S6 or after step S7, the ECU 1 performs the advance control of the exhaust valve 55A (step S8). After a negative determination is made in step S2, the process proceeds to step S8, and the advance control starts when the acceleration of the engine 50 is required in step S8. Subsequently, the ECU 1 determines whether or not the engine 50 does not accelerate (step S9).

For example, the engine rotational speed NE is detected, the amount of change $\Delta NE$ in the engine rotational speed is calculated, and it is determined whether or not the amount of change $\Delta NE$ is smaller than a predetermined value, whereby it can be determined whether or not the engine 50 does not accelerate. Also, for example, the speed of the vehicle is detected, the acceleration is calculated, and it is determined whether or not the acceleration is smaller than a predetermined value, whereby it may be determined whether or not the engine 50 does not accelerate.

Moreover, for example, it is determined whether or not the elapsed time, which elapses from the time when the acceleration of the engine 50 is required, is more than the predetermined time t set such that the intake air amount GA becomes the maximum, whereby it may be determined whether or not the engine 50 does not accelerate. The predetermined time t can be set beforehand depending on, for example, the amount of change $\Delta\alpha$ in pressing level. Additionally, it can be determined whether or not the engine 50 does not accelerate on the basis of the rotational speed of the supercharger 30.

If a negative determination is made in step S9, this flowchart temporarily finishes. In this case, a positive determination is made in step S2 in the next routine. On the other hand, if a positive determination is made in step S9, the ECU 1 set the flag OFF (step S10). In next step S11, the ECU 1 performs the retardation control of the exhaust valve 55A. Next, this flowchart temporarily finishes after step S11.

Next, the effect of the ECU 1 will be described. The ECU 1 performs the phase control making the opening timing of the exhaust valve 55A identical to the opening timing of the exhaust valve 55B, when the engine 50 accelerates. Specifically, the phase control, which makes the phase of the exhaust valve 55A identical to the phase of the exhaust valve 55B, is performed. Thus, the ECU 1 can emphasize the feeling of the acceleration by use of the exhaust sound when the engine 50 accelerates.

Accordingly, the ECU 1 can suitably control the exhaust sound of the engine 50 provided with the exhaust VVT 57 in consideration of the acceleration of the engine 50. Specifically, the phase control varying the opening timing of the exhaust valve 55A is performed, for example, so as to generate the phase difference γ between the exhaust valves 55A and 55B when the vehicle is in the steady driving state, thereby suppressing the exhaust sound.

In this regard, the ECU 1 performs the advance control making the phase of the exhaust valve 55A identical to the phase of the exhaust valve 55B, when the engine 50 accelerates. Herein, in general, the blow down pressure of the exhaust is lower as the exhaust valves 55A and 55B are further retarded. Therefore, the ECU 1 can suitably emphasize the exhaust sound by performing the advance control making the phase of the exhaust valve 55A identical to the phase of the exhaust valve 55B.

Also, the ECU 1 performs the retardation control retarding the phase of the exhaust valve 55A so as to increase the phase difference γ between the exhaust valves 55A and 55B, when the vehicle is in the steady driving state. Therefore, when the vehicle is in the steady driving state, the ECU 1 can reduce the compression ratio of the engine 50 in a consistent manner with the advance control making the phase of the exhaust valve 55A identical to the phase of the exhaust valve 55B. This improves the fuel consumption and the exhaust emission at the same time.

Also, the ECU 1 adjusts the amount of change in the phase of the exhaust valve 55A depending on the amount of change Δα in pressing level, thereby suitably controlling the exhaust sound depending on the degree of the acceleration requirement. Further, the ECU 1 starts performing the phase control making the opening timing of the exhaust valve 55A identical to the opening timing of the exhaust valve 55B when the acceleration of the engine 50 is required, thereby suitably controlling the exhaust sound of the engine 50 in the aspect of timing.

Furthermore, the ECU 1 performs the phase control making the opening timing of the exhaust valve 55A identical to the opening timing of the exhaust valve 55B when the engine 50 provided with the supercharger 30 accelerates, thereby increasing the exhaust energy. Therefore, the improvement in the supercharging pressure improves the acceleration performance and the exhaust sound level. Accordingly, the feeling of the acceleration can be suitably emphasized.

Figure 7:
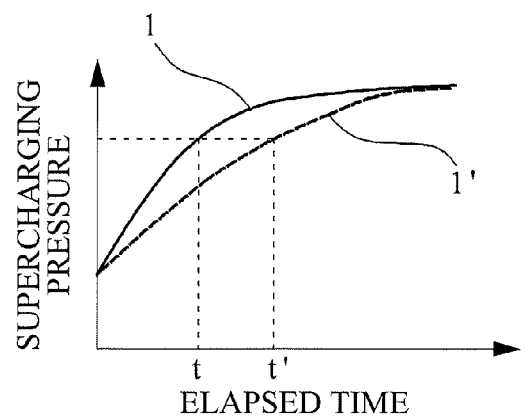
FIG. 7 is a view of a change in the supercharging pressure depending on the elapsed time.
Figure 8:
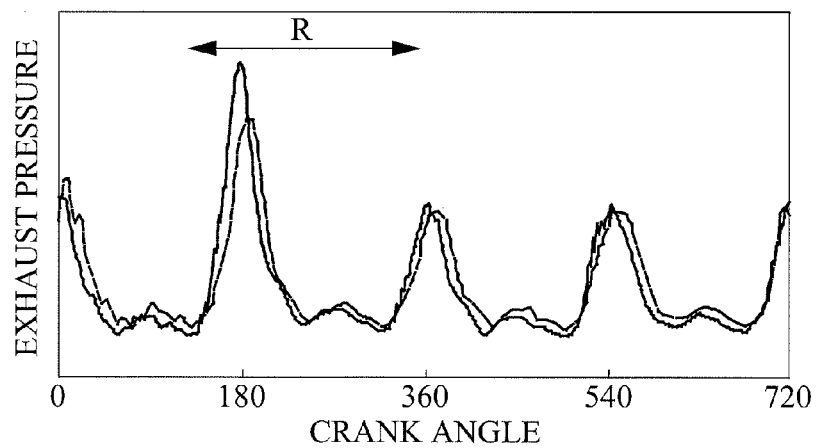
FIG. 8 is a view of an example of a change in the exhaust pressure pulsation.

Moreover, when the engine 50 provided with the supercharger 30 accelerates, the ECU 1 performs the phase control such that the intake air amount GA achieves the predetermined amount in the predetermined time t, thereby quickly increasing the supercharging pressure. FIG. 7 is a view of a change in the supercharging pressure depending on the elapsed time. The vertical axis indicates the supercharging pressure, and the horizontal axis indicates the elapsed time elapsing from the time when the acceleration of the engine 50 is required. An ECU 1' indicates a case of not performing the phase control making the opening timing of the exhaust valve 55A identical to the opening timing of the exhaust valve 55B at the time when the engine 50 accelerates.

As illustrated in FIG. 7, the ECU 1 can increase the supercharging pressure quickly, as compared with the ECU 1'. Specifically, the ECU 1 can increase the supercharging pressure to achieve the same value in the predetermined time t shorter than the elapsed time t' required for the ECU 1'. Thus, the ECU 1 can more suitably emphasize the feeling of the acceleration.

While the exemplary embodiments of the present invention have been illustrated in detail, the present invention is not limited to the above-mentioned embodiments, and other embodiments, variations and modifications may be made without departing from the scope of the present invention.

For example, the engine may be a spark-ignition type internal combustion engine. Also, for example, plural one-exhaust valves or plural another-exhaust valves may be provided.

Description Of Letters Or Numerals

ECU 1, 1'
supercharger 30
engine 50
exhaust valve 55, 55A, 55B
fuel injection valve 56
exhaust VVT 57
combustion chamber 58
accelerator pedal 80

The invention claimed is:

1. A control device for an engine provided with a valve device which is capable of varying opening and closing timings of at least one exhaust valve of a plurality of exhaust valves provided for a combustion chamber with respect to opening and closing timings of another exhaust valve of the plurality of exhaust valves, the control device for the engine comprising a control unit configured to perform phase control for making a phase of the one exhaust valve identical to a phase of the another exhaust valve depending on an amount of change in pressing level of an accelerator pedal, when performing the phase control at the time when the engine accelerates.

2. The control device for the engine of claim 1, wherein the control unit is configured to perform advance control for making the phase of the one exhaust valve identical to the phase of the another exhaust valve.

3. The control device for the engine of claim 2, wherein the control unit is configured to perform retardation control for retarding the phase of the one exhaust valve to increase a phase difference between the one exhaust valve and the another exhaust valve when the engine does not accelerate.

\* \* \* \* \*